UNITED STATES PATENT OFFICE.

HARRY A. KENNEDY, OF CLEARFIELD, PENNSYLVANIA.

REFRACTORY MATERIAL AND PROCESS OF MAKING THE SAME.

1,238,020.     Specification of Letters Patent.     Patented Aug. 21, 1917.

No Drawing.     Application filed November 28, 1916. Serial No. 133,930.

*To all whom it may concern:*

Be it known that I, HARRY A. KENNEDY, a citizen of the United States, residing at Clearfield, in the county of Clearfield and State of Pennsylvania, have invented certain new and useful Improvements in Refractory Materials and Processes of Making the Same, of which the following is a specification.

My invention relates to a new refractory material and to the process of making the same. The product is obtained by subjecting a finely-divided mixture containing lime, magnesia, silica and oxid of iron or alumina to an exceedingly high temperature whereby the powdered material is concreted or sintered into a nodulized mass, the various ingredients having been by this treatment chemically and physically combined to produce a product which is highly refractory and of constant volume, not subject to change of volume upon subjection to atmospheric moisture or carbon dioxid, and which remains of constant volume even after being subjected to the high heats incident to its use as a lining for open hearth steel furnaces. As a starting material, I prefer to use magnesian limestone or dolomite, which, as is well known, varies widely in its relative proportion of magnesium and calcium carbonate, not only in different localities, but in the strata of the same quarry. A similar variation is found in the quantity of impurities, such as silica, alumina and iron, usually present as oxid of iron.

I have found by long experiment that, in order to possess the refractory qualities desired, the finished product should preferably contain, as shown by the chemical analysis from 78-92 per cent. of calcium and magnesium oxid; 2-13 per cent. of silica; and alumina and iron oxid in quantity varying according to conditions, as hereinafter stated.

Small variations from these proportions, while permissible, are still within the scope of my invention; but I have found that the best results are obtained by keeping within the limits above specified.

The following table shows analyses of different samples of my improved product:—

|  | "A" | "B" | "C" | "D" | "E" |
|---|---|---|---|---|---|
| MgO | 36.00 | 40.00 | 30.00 | 25.00 | 42.00 |
| CaO | 50.00 | 40.00 | 50.00 | 53.00 | 50.00 |
| Silica | 6.00 | 6.00 | 12.00 | 13.00 | 2.00 |
| Alumina | 3.00 | 14 {3.00 | 3.00 | 3.00 | 6 {1.00 |
| Iron oxid | 5.00 | {11.00 | 5.00 | 6.00 | {5.00 |

Samples "B", "C" and "D" are well suited for use in the making of bottoms and repairs in basic open-hearth furnaces; and samples "A" and "E" are suitable for work above the flux line of such furnaces, or for what are known in the art as "renewals," *i. e.* where higher refractoriness is required.

Care must be taken to avoid the use of more than 12 or 13 per cent. of silica, as above this percentage of silica, there is danger of the formation of calcium orthosilicate compounds.

I desire it to be understood that alumina and iron oxid are, for my purposes, substantially equivalent, and are to be estimated together. As there is no generic term which characterizes alumina and iron oxid, I have used in the claims the term "oxid fluxing agent", by which is meant that either alumina alone, or oxid of iron alone, or oxid of iron and alumina may be used in accordance with the directions hereinafter given. Silica and these fluxing oxids in the rotary kiln form fusible compounds and thereby facilitate the reaction which takes place between the silica, alumina and iron oxid (which are, at the high temperatures employed, acids) with the lime and magnesia, with the resulting formation of a compound containing silicates, aluminates and ferrates of calcium and magnesium. If the natural raw materials contain sufficient alumina, no iron oxid need be used, although I prefer to add some iron oxid, as I have found that its presence serves to add toughness in the finished material. Where the natural raw materials are relatively high in silica, a correspondingly less amount of iron and alumina may be used, and when the silica content is relatively low, more iron oxid may be added. As long as the percentage of silica is kept below the limit above stated, silica may be substituted for a portion of the alumina and iron oxid.

Other analogous materials, such as basic open-hearth slag, blast furnace slag, bauxite or chrome ore may be used as fluxing "impurities," and are included within the scope of my invention.

In order to produce my new materials, a mixture suitable for obtaining the desired qualities is obtained, either by selecting raw rock having the proper proportions of bases and impurities, or by mixing raw rock of different compositions, or by adding to raw rock, or a mixture of rocks, a sufficient quantity of iron oxid, usually in the form of iron ore. The mixed ingredients are then ground in a series of mills, by methods such as are used for preparing Portland cement mixtures, until they are in a finely pulverulent condition, care being taken that in the various grinding and transferring operations a thorough and intimate mixture of the ingredients is obtained. The limestone may, if desired, be brought into the desired finely-divided condition by first calcining it in an ordinary kiln and then hydrating it in the usual manner, the finely-divided lime-magnesium hydrate being then mixed with the other ingredients as above specified. This method is, however, more expensive, and substantially the same results may be had by burning the mechanically reduced stone, using a higher temperature. The mixed raw material, either dry or as a wet slurry, is then heated, while under agitation, to an exceedingly high temperature, by which I mean a temperature in excess of that used in the manufacture of Portland cement, the temperatures used in burning cement averaging about 2850° F. in the burning zone of a rotary kiln, (Eckels, "*Cements, Limes and Plasters*," 1907, page 500). This heating is preferably carried out in a rotary kiln heated by a powdered fuel flame. From the rotary kiln, the red-hot material is delivered to a cooling cylinder and is then ready for use.

As compared with the process of burning cement clinker in the usual rotary kiln, I find it necessary to rotate the kiln at a less speed, or have a less inclination of the kiln, and to use a higher temperature, with the result that the material under treatment progresses more slowly through the kiln and is subjected for a longer time to the high temperature in the burning zone, the necessary conditions for the formation of new chemical combinations between the intimately mixed ingredients being thus provided.

As a result of this treatment the finely-divided materials are aggregated into nodules or lumps of varying sizes, but of generally uniform composition. These nodules or lumps are formed by partial fusion, whereby there results the formation of a mass of sintered or clinkered compound.

Whatever be the chemical combinations, the resulting product has refractory qualities such as make it a satisfactory substitute for magnesite in open-hearth and other furnace work. It is superior to any of the forms of calcined or hard shrunk magnesian limestone or dolomite in that it is of constant volume even after repeated heating and cooling.

Thus the bottom of an open-hearth furnace, if made of calcined dolomite, will, when the furnace is cooled down, readily absorb moisture and carbonic acid from the air and furnace gases, and will swell or puff up so that it has to be removed before a new lining is made; while my new material, under like conditions, is unaffected, remaining in the furnace as a hard, concreted mass of unchanging volume.

Furnace bottoms made from my material last longer and can far more readily be temporarily or permanently repaired or renewed, than those made from any form of calcined or hard shrunk dolomite or dolomitic limestone. It has the further advantage that owing to the new chemical combinations formed by the treatment above described, my new material does not lose its availability for use as a refractory, even after long exposure to the weather.

While I have described, as the preferred source of magnesia and lime, natural magnesian limestone, my invention also includes the use of lime and magnesia, or compounds other than carbonates containing lime or magnesia, or compounds from which lime and magnesia may be produced in carrying out my process.

I claim:—

1. A refractory material comprising a mass of clinkered nodules consisting of a compound having the following analysis:— calcium and magnesium oxids, seventy-eight to ninety-two (78-92) per cent.; silica, two to thirteen (2-13) per cent.; and an oxid fluxing agent.

2. The process of making a basic refractory material which consists in subjecting an intimate mixture of a calcium compound, a magnesian compound, silica, and an oxid fluxing agent to a very high temperature while under agitation for a period of time sufficient to produce a clinkered compound, the material being used in such proportions that analysis of the compound shows calcium and magnesium oxids, seventy-eight to ninety-two (78-92) per cent.; silica, two to thirteen, (2-13) per cent.; and an oxid fluxing agent, substantially as described.

3. The process of making a basic refractory material which consists in subjecting an intimate mixture of calcium oxid, magnesium oxid, silica, and an oxid fluxing agent to a very high temperature in a rotary kiln for a period of time sufficient to produce a clinkered compound, the materials being used in such proportions that analysis of the compound shows calcium and magnesium oxids seventy-eight to ninety-two (78-92) per cent., silica, two to thirteen (2-13) per cent., and an oxid fluxing agent, substantially as described.

In testimony whereof I affix my signature.

HARRY A. KENNEDY.